US012659046B2

(12) United States Patent
Menchetti

(10) Patent No.: US 12,659,046 B2
(45) Date of Patent: Jun. 16, 2026

(54) TO NETWORK SYNCHRONIZATION

(71) Applicant: BRITISH TELECOMMUNICATIONS PUBLIC LIMITED COMPANY, London (GB)

(72) Inventor: Marco Menchetti, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 267 days.

(21) Appl. No.: 18/551,714

(22) PCT Filed: Mar. 9, 2022

(86) PCT No.: PCT/EP2022/056019
§ 371 (c)(1),
(2) Date: Sep. 21, 2023

(87) PCT Pub. No.: WO2022/200045
PCT Pub. Date: Sep. 29, 2022

(65) Prior Publication Data
US 2024/0178922 A1 May 30, 2024

(30) Foreign Application Priority Data
Mar. 23, 2021 (GB) ...................................... 2104000

(51) Int. Cl.
*H04B 10/61* (2013.01)
*H04B 10/27* (2013.01)
(Continued)

(52) U.S. Cl.
CPC ......... *H04B 10/6165* (2013.01); *H04B 10/27* (2013.01); *H04B 10/548* (2013.01); *H04B 10/64* (2013.01)

(58) Field of Classification Search
CPC .. H04B 10/6165; H04B 10/27; H04B 10/548; H04B 10/64
(Continued)

(56) References Cited

U.S. PATENT DOCUMENTS 5,896,211 A * 4/1999 Watanabe ............ H04B 10/504
398/187
7,634,201 B2 * 12/2009 Maleki ..................... H03D 9/00
398/118
(Continued)

FOREIGN PATENT DOCUMENTS

JP       H0324829 A      2/1991
JP       2006266797 A   10/2006

OTHER PUBLICATIONS

"International Search Report and Written Opinion received for PCT Patent Application No. PCT/EP2022/056019, mailed on Jun. 13, 2022".
(Continued)

*Primary Examiner* — Dalzid E Singh
(74) *Attorney, Agent, or Firm* — EIP US LLP

(57) ABSTRACT

There is herein provided a method of controlling the frequency of operation of a component of a telecommunications network, the method including combining a first signal and a second signal to form a heterodyne signal, transmitting the heterodyne signal from a first node of the telecommunications network, detecting the transmitted heterodyne signal at a second node of the telecommunications network, and controlling a frequency of operation of a component of the telecommunications network using a frequency of the detected heterodyne signal.

10 Claims, 4 Drawing Sheets

(51) Int. Cl.
　　　*H04B 10/548*　　　(2013.01)
　　　*H04B 10/64*　　　(2013.01)
(58) Field of Classification Search
　　　USPC ......................................................... 398/140
　　　See application file for complete search history.

(56) References Cited

U.S. PATENT DOCUMENTS

| | | | |
|---|---|---|---|
| 8,331,802 B2 * | 12/2012 | Fujii | ..................... H04B 10/61 |
| | | | 398/203 |
| 8,473,638 B2 | 6/2013 | Aweya et al. | |
| 9,112,631 B2 | 8/2015 | Aweya et al. | |
| 2005/0078317 A1 | 4/2005 | Law et al. | |
| 2009/0047023 A1 | 2/2009 | Pescod et al. | |

OTHER PUBLICATIONS

"Office Action received for Great Britan Patent Application No. 2104000.1, mailed on Jan. 5, 2022".
Foreman, et al., "Remote Transfer of Ultrastable Frequency References via Fiber Networks" The Review of Scientific Instruments 78, 021101, DOI: 10.1063/1.2437069 , 2007, pp. 1-25.

* cited by examiner

TO NETWORK SYNCHRONIZATION

PRIORITY CLAIM

The present application is a National Phase entry of PCT Application No. PCT/EP2022/056019, filed Mar. 9, 2022, which claims priority from GB Patent Application No. 2104000.1, filed Mar. 23, 2021, each of which is hereby fully incorporated herein by reference.

TECHNICAL FIELD

This disclosure relates generally to telecommunications networks and more particularly to synchronization of the frequency of operation of components within telecommunications networks.

BACKGROUND

It is desirable to synchronize the various components within a telecommunications network in order to improve the efficiency of the network. For example, it is desirable to synchronize the frequency of operation of the local oscillators present in each of the network's nodes. It is also desirable to synchronize the phase of the local oscillators, such that each oscillator starts from the same value. The present disclosure concerns synchronization of frequency of operation.

Known methods for synchronizing the frequency of operation include intensity modulation. In particular, a continuous wave laser signal is modulated at the desired frequency of operation of the local oscillator of a node. The laser signal is transmitted from the network exchange to the node where in is detected at a photodetector, which converts it to an electrical signal and applies that electrical signal to the local oscillator of the node.

SUMMARY

It would be desirable to have alternative frequency synchronization methods.

Embodiments of the present disclosure address some or all of the above-mentioned and/or other disadvantages associated with conventional approaches.

According to a first aspect of the disclosure there is provided a method of controlling the frequency of operation of a component of a telecommunications network, the method comprising: combining a first signal and a second signal to form a heterodyne signal; transmitting the heterodyne signal from a first node of the telecommunications network; detecting the transmitted heterodyne signal at a second node of the telecommunications network; and controlling a frequency of operation of a component of the telecommunications network using a frequency of the detected heterodyne signal.

Embodiments of the disclosure enable network components, such as local oscillators, to be synchronized more accurately than in known methods. In known methods, such as intensity modulation, the synchronization signal is intensity modulated with the desired operative frequency of the local oscillator. This synchronization signal is transmitted from the network exchange to a node in the network. The received signal is often noisy, which reduces accuracy. Embodiments of the present disclosure enable the operative frequency to be carried as the beat frequency of a heterodyne signal. Heterodyne signals are formed of two signals and both suffer noise. The frequency difference between them, i.e. the beat frequency, is largely unaffected by noise. The resulting technique therefore provides more accurate synchronization.

The first signal and/or the second signal may be optical signals and may be laser signals and may be transmitted over an optical fiber. The first node may be the network exchange. The first node may be located remotely from the second node. The method may be a method for synchronizing the local oscillator to a reference frequency for the network. The frequency of the first signal and/or the second signal may be from 100 THz to 400 THz. The frequency of the heterodyne signal may be the difference between the frequency of the first signal and the frequency of the second signal and may be from 5 MHz to 100 MHz and may be from 30 MHz to 50 MHz and may be approximately 40 MHz.

The second node may be located at a street cabinet within the network. Detecting the heterodyne signal at the second node may be performed by a photodetector. The component of the telecommunications network may be a local oscillator and may be a local oscillator of the node. Ssing a frequency of the detected heterodyne signal to control a frequency of operation of a component of the telecommunications network may comprise reducing the frequency of the detected heterodyne signal. This may be performed using a frequency divider or direct digital synthesis. The reduced frequency may be from 5 MHz to 10 MHz and is approximately 10 MHz in one embodiment.

The method may further comprise controlling the frequency of the heterodyne signal. This may comprise modifying a frequency of the first signal prior to combining the first signal and the second signal. This may be performed by a modulator which may be an acousto-optic modulator and may be a free-space acousto-optic modulator.

Modifying a frequency of the heterodyne signal may comprise modifying a frequency of the first signal. This may take into account the frequency of the heterodyne signal and may comprise measuring a frequency of the heterodyne signal. This may further take into account a predetermined desired frequency of operation of the local oscillator. The method may further comprise monitoring a frequency of the heterodyne signal.

The first signal and the second signal may be produced by splitting the output of a single laser source. In alternative embodiments the first and second signals may be produced by two separate laser sources. In these embodiments modifying a frequency of the first signal or the second signal may comprise modifying the frequency of one of the laser sources.

According to a second aspect of the disclosure there is provided a system for controlling the frequency of operation of a component of a telecommunications network, the system comprising: a combiner adapted to combine a first signal and a second signal to form a heterodyne signal; a transmitter adapted to transmit the heterodyne signal from a first node of the telecommunications network; a detector adapted to detect the transmitted heterodyne signal at a second node of the telecommunications network; and a controller adapted to control a frequency of operation of a component of the telecommunications network using a frequency of the detected heterodyne signal.

BRIEF DESCRIPTION OF THE DRAWINGS

An embodiment of the disclosure will now be described in detail, for illustration only, and with reference to the accompanying drawings, in which.

DETAILED DESCRIPTION

Figure 1:
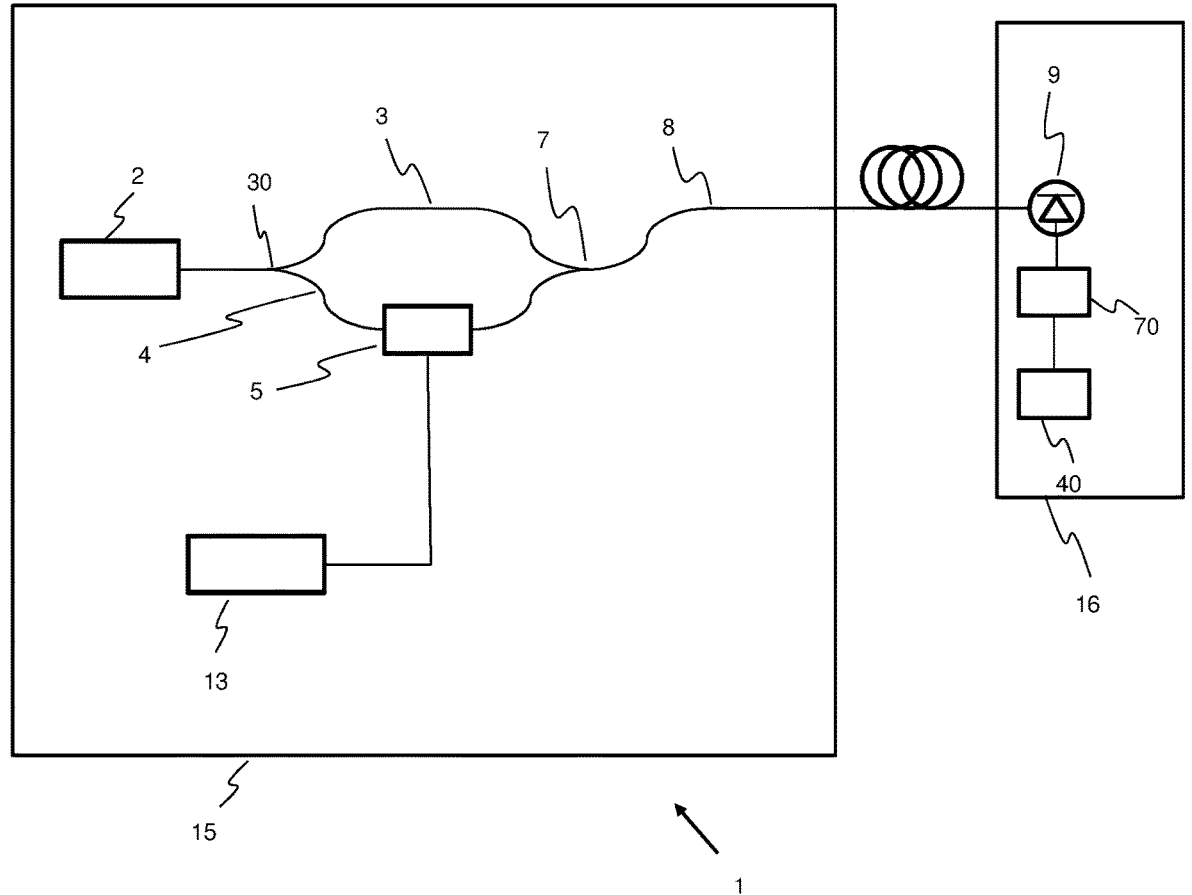
FIG. 1 is a schematic view of a system in accordance with a first embodiment of the disclosure.

The arrangement in accordance with embodiments of the disclosure is shown generally at 1 of FIG. 1. In particular 15 represents a telecommunications network exchange. At the exchange is a laser 2. The laser emits a continuous wave signal at 1550 nm onto an optical fiber. A 1×2 optical splitter 30 splits the signal into two branches 3 and 4. Branch 4 carries the signal to acousto-optic modulator 5 which receives an input signal from frequency reference 13.

The acousto-optic modulator 5 causes the frequency of the continuous wave laser signal from exchange 15 to increase by an amount equal to the frequency of the input signal from the frequency reference 13. The frequency of the input signal is approximately 40 MHz. The two branches 3 and 4 then combine at a 2×1 optical splitter 7 and pass to photodetector 9 located at node 16. In this case the node 16 is a street cabinet. The photodetector 9 detects the laser signal. The act of combining the signals on the two branches 3 and 4 causes two heterodynes to be created. Referring the frequency of the signal on branch 3 as f3 and the frequency of the signal on branch 4 to be f4, the two heterodynes have the frequency f3+f4 and f3−f4 respectively. The frequency f3+f4 is approximately 400 THz. This is outside the sensitivity range of photodetector 9. The frequency f3−f4 has the frequency of approximately 40 MHz which is within the sensitivity range of photodetector 9. It is therefore the f3−f4 heterodyne which is detected. The detected signal is converted into an electrical signal by photodetector 9 and the electrical signal is passed through a frequency divider 70 which reduces the frequency of the signal from approximately 40 MHz to approximately 10 MHz. The 10 MHz signal is then input to the local oscillator 40. The local oscillator 40 uses this frequency as is frequency of operation.

Figure 2:
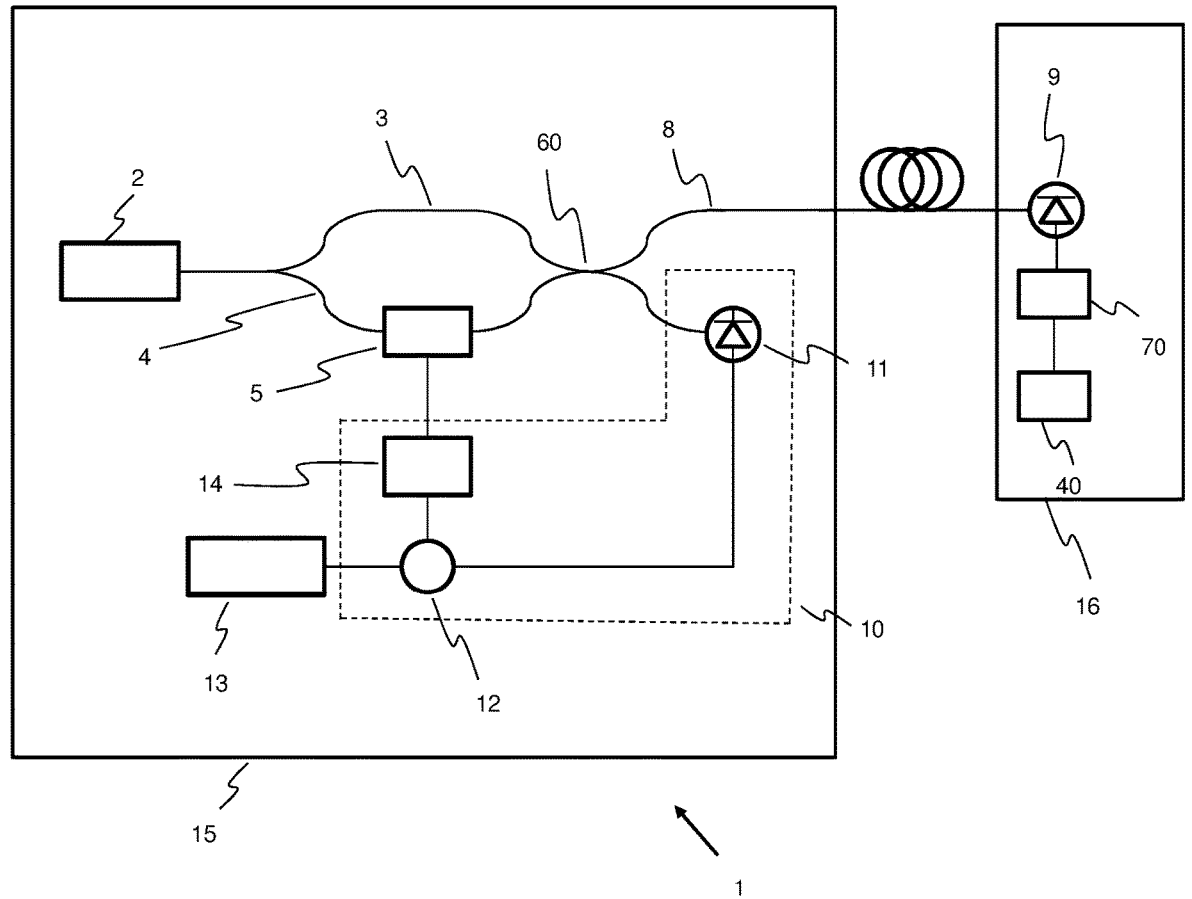
FIG. 2 a schematic view of a system in accordance with a variation of the first embodiment of the disclosure.

Turning now to FIG. 2, like elements have the same reference number as in FIG. 1. It may be that the frequency detected at photodetector 9 differs from that input to acousto-optic modulator 5. This is exacerbated by noisy environments. To address this, a frequency stabilization feedback circuit is provided. This generally comprises the components shown within the dotted area 10 in FIG. 2. In this embodiment, the 2×1 splitter 7 is replaced by a 2×2 splitter 60. As well as outputting the heterodynes to the photodetector 9, the splitter 60 also outputs the heterodynes to photodetector 11 within the exchange 15. Photodetector 11 has a similar range of sensitivity to photodetector 9 and so detects the f3−f4 heterodyne but not the f3+f4 heterodyne. Photodetector 11 converts the optical signal to an electrical signal and provides it to mixer 12, which also receives an input from the frequency reference 13. The mixer 12 outputs a signal to voltage-controlled oscillator (VCO) 14. VCO 14 modifies the signal it applies to acousto-optic modulator 5 with the aim of bringing the frequency of the signal detected by photodetector 11 as close as possible to the desired frequency for transmission to node 16. Thus a feedback circuit is provided to stabilize the signal output by the exchange 15 to node 16.

Figure 3:
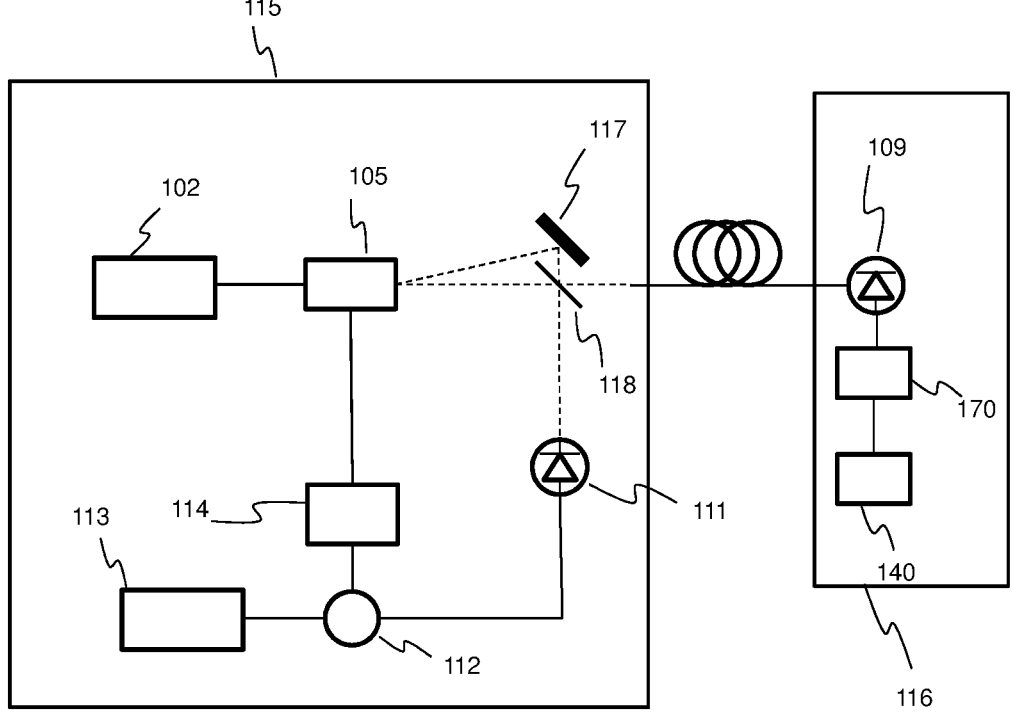
FIG. 3 a schematic view of a system in accordance with a second embodiment of the disclosure.

FIG. 3 shows a further embodiment of the disclosure in which like elements with FIG. 2 have the same reference numeral+100. In particular a continuous wave laser signal with a frequency of F is output from laser 102 at node 115. The signal passes to a free-space acousto-optic modulator 105 (free-space AOM). The free-space AOM 105 also receives an input signal (with a frequency of f) originating from frequency reference 113. This frequency f is approximately 40 MHz. The free-space AOM 105 outputs multiple laser signals into free space in different directions. In particular, it outputs a $0^{th}$ order signal, a $1^{st}$ order signal, a $2^{nd}$ order signal and so-on. The $0^{th}$ order signal has the same frequency as the signal the AOM 105 receives from the laser 102 (i.e. F). The frequency of the $1^{st}$ order signal is that of the frequency of the laser 102 plus the frequency f of the signal the AOM 105 receives from the frequency reference 113 (i.e. F+f). The frequency of the $2^{nd}$ order signal is that of the frequency of the laser 102 (F) plus twice the frequency (2f) of the signal the AOM 105 receives from the frequency reference 113 (i.e. F+2f). It is the $0^{th}$ order and $1^{st}$ order signals only that are of interest here.

The $0^{th}$ order signal is directed to 50:50 beam splitter 118, which redirects a portion of it to photodetector 111 and allows a portion to pass through, towards node 116. The $1^{st}$ order signal is directed to mirror 117 which reflects it to the beam splitter 118. A portion of the $1^{st}$ order signal passes through the beam splitter 118 to photodetector 111 and a portion is diverted towards node 116.

The portion of the $0^{th}$ order signal that passes through the beam splitter 118 combines with the portion of the first order signal that has been redirected by beam splitter 118 towards the node 116. These two signals combine to form two heterodynes with frequencies 2F+f and f. The two heterodynes are injected into an optical fiber which carries them to the photodetector 109 of node 116. The sensitivity range of the photodetector 109 is such that it is capable of detecting f but not 2F+f. The detected signal is converted to an electrical signal of frequency f, reduced in frequency by frequency divider 170 to 10 MHz and then passed to the local oscillator 140. Thus local oscillator 140 has been synchronized to frequency f, which is its desired operating frequency. The embodiment of FIG. 3 therefore achieves the same purpose as the embodiments of FIGS. 1 and 2.

In addition, the portion of the first order signal that passes through beam splitter 118 combines with the portion of the $0^{th}$ order signal that is redirected by the beam splitter 118 to form two heterodynes with frequencies 2F+f and f. The sensitivity range of the photodetector 111 is such that it is capable of detecting f but not 2F+f. As f is the desired frequency of the local oscillator 140, the components 111-114 operate as a frequency stabilization feedback circuit, identical to that described in relation to FIG. 2.

Figure 4:
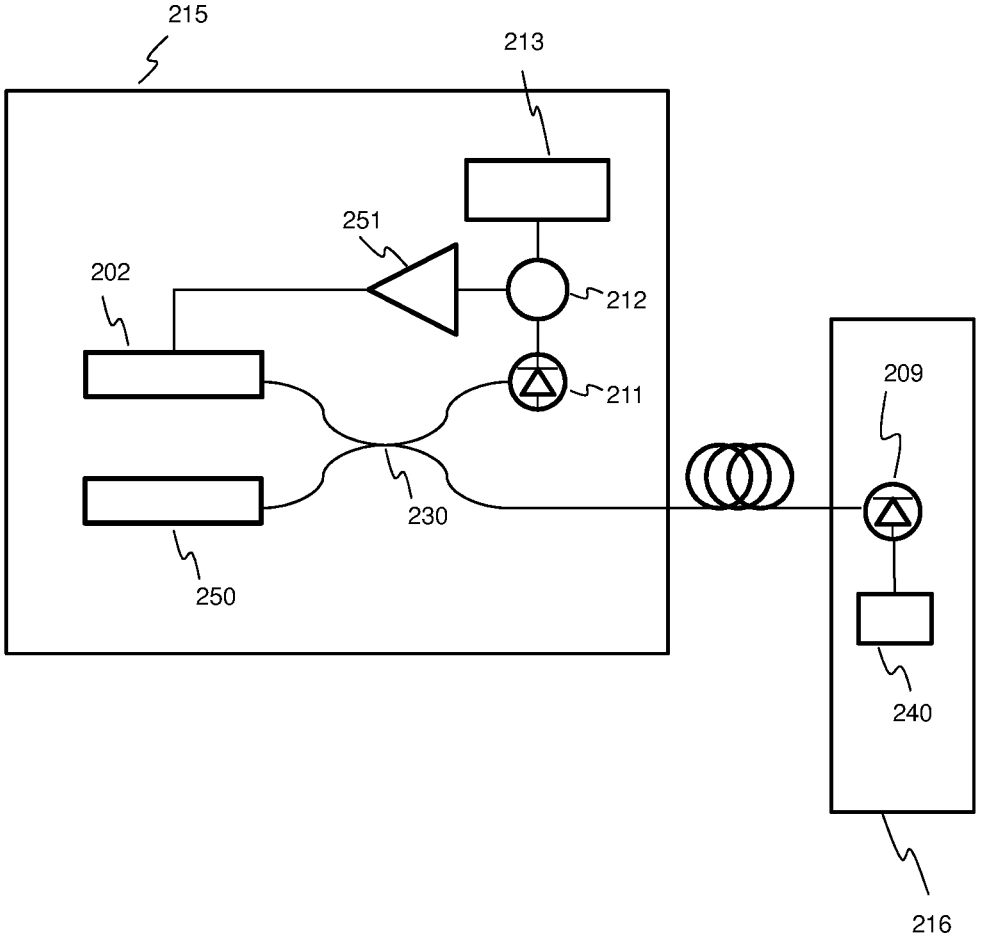
FIG. 4 is a schematic view of a system in accordance with a third embodiment of the disclosure.

FIG. 4 shows an alternative embodiment of the disclosure. This embodiment has two lasers 202 and 250, each of which output a continuous wave signal at approximately 1550 nm, which I will refer to as f1 and f2. The signals are provided to the inputs of a 2×2 optical splitter 230. One of the splitter's output fibers carry the resulting heterodyne to a photodetector 209 connected to the local oscillator 240 of node 216. Similarly to previous embodiments, the photodetector detects the beat frequency f1-f2, and applies that beat frequency to the local oscillator 240.

The other of the splitter's output fibers carries the heterodynes to photodetector 211 within the exchange 215. Photodetector 211 detects the beat frequency f1-f2. Photodetector 211 converts the optical signal to an electrical signal and provides it to mixer 212, which also receives an input from the frequency reference 213. The input from frequency reference 213 is at the desired frequency of operation of the local oscillator 240 in node 216. The mixer 212 outputs a signal to a Proportional-Integral-Derivative Controller (PID) 251. PID 251 uses the feedback this contains from the photodetector 211 to drive the laser 202 and keep it at the frequency of the frequency reference 213. This ensures that the beat frequency detected by the photodetector 209 is at the desired frequency of operation of the local oscillator 240.

The invention claimed is:

1. A method of controlling a frequency of operation of a component of a telecommunications network, the method comprising:

forming a heterodyne signal from a first signal and a second signal by:

controlling a beat frequency of the heterodyne signal by modifying a frequency of the first signal by a modulator, and then combining the frequency-modified first signal and the second signal to form the heterodyne signal;

transmitting the heterodyne signal from a first node of the telecommunications network;

detecting the transmitted heterodyne signal at a second node of the telecommunications network; and controlling a frequency of operation of a component of the telecommunications network using a frequency of the detected heterodyne signal.

2. The method as claimed in claim 1, wherein the first signal and the second signal are laser signals.

3. The method as claimed in claim 1, wherein the first node is located remotely from the second node.

4. The method as claimed in claim 1, wherein the component of the telecommunications network is a local oscillator of the second node.

5. The method as claimed in in claim 1, wherein the modulator is an acousto-optic modulator.

6. A system for controlling a frequency of operation of a component of a telecommunications network, the system comprising:

a combiner adapted to combine a first signal and a second signal to form a heterodyne signal;

a photodetector adapted to measure a beat frequency of the heterodyne signal and use the measured beat frequency to control the beat frequency of the heterodyne signal;

a transmitter adapted to transmit the heterodyne signal from a first node of the telecommunications network;

a detector adapted to detect the transmitted heterodyne signal at a second node of the telecommunications network; and a controller adapted to control a frequency of operation of a component of the telecommunications network using a frequency of the detected heterodyne signal.

7. A method of controlling a frequency of operation of a component of a telecommunications network, the method comprising:

combining a first signal and a second signal to form a heterodyne signal;

measuring a beat frequency of the heterodyne signal and using the measured beat frequency to control the beat frequency of the heterodyne signal;

transmitting the heterodyne signal from a first node of the telecommunications network;

detecting the transmitted heterodyne signal at a second node of the telecommunications network; and controlling a frequency of operation of a component of the telecommunications network using a frequency of the detected heterodyne signal.

8. The method as claimed in claim 7, wherein the first signal and the second signal are laser signals.

9. The method as claimed in claim 7, wherein the first node is located remotely from the second node.

10. The method as claimed in claim 7, wherein the component of the telecommunications network is a local oscillator of the second node.

\* \* \* \* \*